US010216969B2

(12) United States Patent
Feng et al.

(10) Patent No.: US 10,216,969 B2
(45) Date of Patent: Feb. 26, 2019

(54) ILLUMINATOR FOR DIRECTLY PROVIDING DARK FIELD AND BRIGHT FIELD ILLUMINATION

(71) Applicant: Hand Held Products, Inc., Fort Mill, SC (US)

(72) Inventors: Chen Feng, Snohomish, WA (US); Jie Ren, Suzhou (CN); Yunxin Ouyang, Suzhou (CN); Alain Gillet, Galan (FR)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 15/645,070

(22) Filed: Jul. 10, 2017

(65) Prior Publication Data

US 2019/0012500 A1    Jan. 10, 2019

(51) Int. Cl.
| | |
|---|---|
| *G06K 7/10* | (2006.01) |
| *G06K 7/14* | (2006.01) |
| *F21V 3/02* | (2006.01) |
| *F21V 5/00* | (2018.01) |
| *F21Y 115/10* | (2016.01) |

(52) U.S. Cl.
CPC ............. *G06K 7/1413* (2013.01); *F21V 3/02* (2013.01); *F21V 5/007* (2013.01); *F21Y 2115/10* (2016.08); *G06K 2007/10485* (2013.01)

(58) Field of Classification Search
CPC ............ G06K 7/10; G08C 21/00; G06F 17/00
USPC ................. 235/462.006, 462.01, 375, 455
See application file for complete search history.

(56) References Cited

U.S. PATENT DOCUMENTS

| | | | |
|---|---|---|---|
| 6,832,725 | B2 | 12/2004 | Gardiner et al. |
| 7,128,266 | B2 | 10/2006 | Zhu et al. |
| 7,159,783 | B2 | 1/2007 | Walczyk et al. |
| 7,413,127 | B2 | 8/2008 | Ehrhart et al. |
| 7,510,120 | B2 | 3/2009 | Reichenbach et al. |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

U.S. Appl. No. 14/715,916 for Evaluating Image Values filed May 19, 2015 (Ackley); 60 pages.

(Continued)

*Primary Examiner* — Edwyn Labaze
(74) *Attorney, Agent, or Firm* — Additon, Higgins & Pendleton, P.A.

(57) ABSTRACT

Imaging devices and illuminating devices are provided. In one exemplary implementation, an imaging device comprises an optical sensor and an illuminator. The illuminator comprises a support frame and a plurality of light emitting diodes (LEDs) connected to the support frame. A first set of LEDs of the plurality of LEDs is configured to provide dark field illumination at a high angle of incidence with respect to an object. The first set of LEDs is configured to provide illumination without the use of a light pipe, diffuser, or reflector. A second set of LEDs of the plurality of LEDs is configured to provide bright field illumination at a low angle of incidence with respect to the object. The second set of LEDs is configured to provide illumination without the use of a light pipe, diffuser, or reflector.

20 Claims, 4 Drawing Sheets

(56) References Cited

U.S. PATENT DOCUMENTS

| | | |
|---|---|---|
| 7,726,575 B2 | 6/2010 | Wang et al. |
| 7,874,487 B2 | 1/2011 | Nunnink et al. |
| 8,282,000 B2 | 10/2012 | Gerst, III et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,768,159 B2 | 7/2014 | Messina et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |

(56) References Cited

U.S. PATENT DOCUMENTS

| | | |
|---|---|---|
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2005/0087601 A1* | 4/2005 | Gerst, III ............ G06K 7/10732 235/455 |
| 2007/0063048 A1 | 3/2007 | Havens et al. |
| 2007/0091332 A1 | 4/2007 | Nunnink |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |

(56) References Cited

U.S. PATENT DOCUMENTS

| | | |
|---|---|---|
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0021400 A1* | 1/2015 | Lei .................. G06K 7/1404 235/462.42 |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0034735 A1 | 2/2016 | Lei et al. |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

FOREIGN PATENT DOCUMENTS

| | | |
|---|---|---|
| WO | 2014019130 A1 | 2/2014 |
| WO | 2014110495 A1 | 7/2014 |

(56) References Cited

OTHER PUBLICATIONS

U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch Fora Mobile Electronic Device filed Jun. 16, 2015 (Barndringa); 38 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
Search Report in related European Application No. 18182325.3 dated Dec. 10, 2018, pp. 1-7.

\* cited by examiner

ILLUMINATOR FOR DIRECTLY PROVIDING DARK FIELD AND BRIGHT FIELD ILLUMINATION

FIELD OF THE INVENTION

The present invention relates to imaging or sensing devices, such as barcode readers, and more particularly relates to illuminators for illuminating an object to be imaged or sensed.

BACKGROUND

Generally speaking, in order for barcode readers and barcode scanners to operate properly, it may be necessary in some situations that a code (e.g., a barcode) is well lit. When natural light is insufficient to properly illuminate an object, various types of illumination devices may be used in conjunction with the barcode readers and barcode scanners to light different types of barcodes. The type of illumination needed may be a factor of the type of surface on which the barcode is applied. Also, various objects may have different types of barcodes that may be applied in a number of different ways.

One type of code applied to an object is a direct part marking (DPM) code, which is a code that is permanently applied to the object. The DPM codes may be dot peen markings formed on the surface of the product or other types of permanent codes. To properly illuminate a DPM code, it may be necessary to light the code with dark field illumination, which is an illumination technique in which light is directed at a high angle of incidence on the surface of the object, or in other words, directed at a shallow angle with respect to the object's surface. The surface characteristics of a DPM or dot peen marking can be more easily deciphered by a barcode reader or barcode scanner when dark field illumination is applied.

Other surfaces, such as those that are non-reflective and include a flat profile, may instead be better deciphered when bright field illumination is applied. Bright field illumination includes light directed in a way such that the light is at a low angle of incidence with respect to the surface, or in other words, is directed in a substantially perpendicular direction with respect to the object's surface.

Therefore, a need exists for illuminators and other types of illumination devices for providing light directed in a manner that includes both dark field illumination and bright field illumination. Thus, optical imaging devices (e.g., barcode readers, barcode scanners, or other sensing devices) can more accurately decipher the barcodes and other types of codes.

SUMMARY

Accordingly, in one aspect, the present invention embraces imaging devices for sensing an object, such as barcode. The present invention also embraces illuminators and illumination devices that may be used with imaging device. The illuminators are configured to provide both dark field illumination and bright field illumination.

In an exemplary embodiment, an illuminator comprises a support frame and an optical diffuser connected to the support frame. The illuminator further comprises a first plurality of light emitting diodes (LEDs) connected to the support frame, wherein the first plurality of LEDs is configured to provide dark field illumination at a high angle of incidence with respect to an object. Also, the first plurality of LEDs is configured to provide illumination to the object without the use of a light pipe, diffuser, or reflector. The illuminator further comprises a second plurality of LEDs connected to the support frame. The second plurality of LEDs is configured to provide bright field illumination at a low angle of incidence with respect to the object and is configured to provide illumination to the object without the use of a light pipe, diffuser, or reflector. Furthermore, the illuminator includes a third plurality of LEDs connected to the support frame. The third plurality of LEDs is configured to provide bright field illumination through the optical diffuser without the use of a light pipe or reflector.

In yet another exemplary embodiment, an imaging device comprises an optical sensor and an illuminator. The illuminator includes a support frame and a plurality of light emitting diodes (LEDs) connected to the support frame. A first set of LEDs of the plurality of LEDs is configured to provide dark field illumination at a high angle of incidence with respect to an object. Also, the first set of LEDs is configured to provide illumination without the use of a light pipe, diffuser, or reflector. A second set of LEDs of the plurality of LEDs is configured to provide bright field illumination at a low angle of incidence with respect to the object. This second set of LEDs is also configured to provide illumination without the use of a light pipe, diffuser, or reflector.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces illuminators and other illumination devices for illuminating an object to be sensed. In some embodiments, the object may be a barcode or may be an item on which is barcode is applied. Since dark field illumination may be needed as some times while bright field illumination may be needed as other times, it may be desirable to provide a light source capable of providing both dark and bright field illumination to account for different objects and different scanning environments.

The present invention is also directed to illuminators that are able to provide sufficient illumination while minimizing the amount of energy needed to power the light elements. The light elements may include light emitting diodes (LEDs) or other types of lights. For example, the illuminators of the present disclosure may include fewer LEDs than other types of illuminators, but may provide dark field and bright field illumination that is comparable to more expensive, higher energy-consuming devices. One way that the present invention is able to maximize light distribution is by avoiding techniques that can reduce the brightness of light. For instance, the present invention does not use light pipes and reflectors. Also, many of the LEDs are able to direct light directly to the object to be sensed without diffusers, although some diffusers may be used in the present invention for diffusing some of the light.

Figure 1:
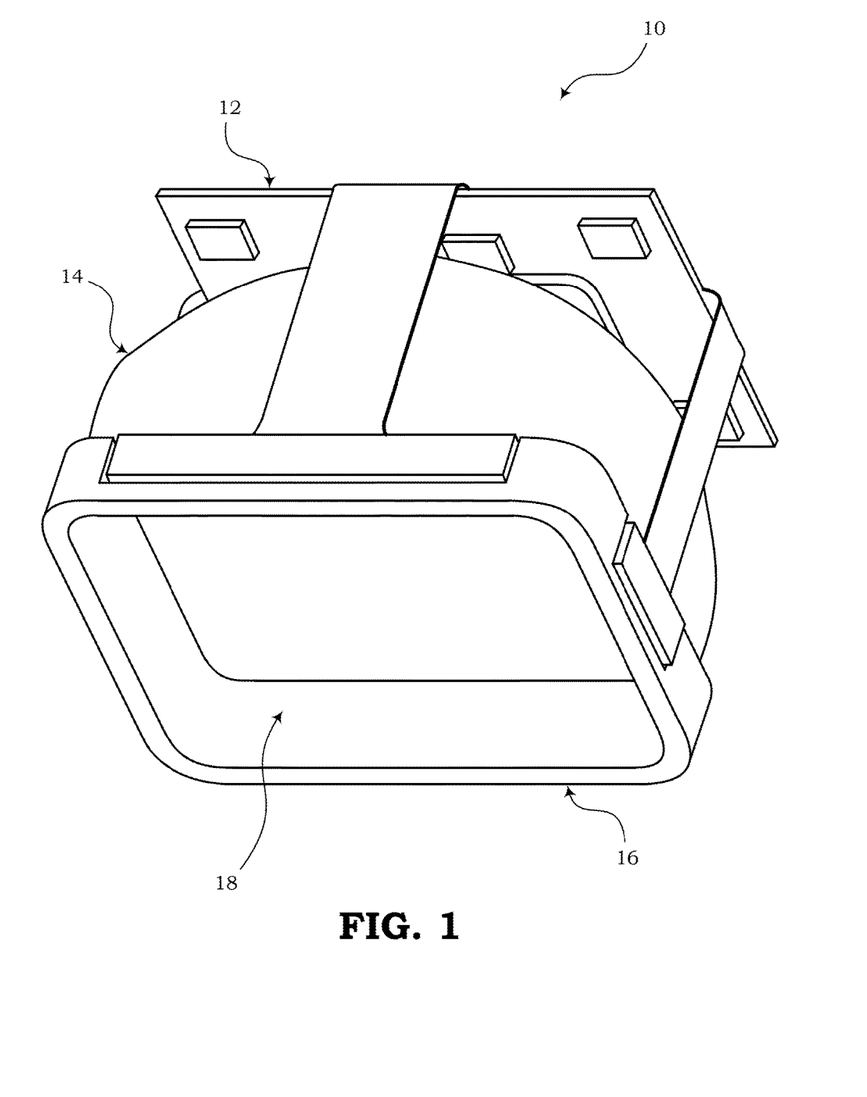
FIG. 1 schematically depicts a perspective view of an illuminator according to an embodiment of the present invention.

FIG. 1 illustrates a view of an embodiment of an illuminator 10, shown in its complete form. Generally, the illuminator 10 includes a support frame 12, an optical diffuser 14, and a rigid belt 16. The support frame 12 is configured to support a plurality of LEDs, where some LEDs are configured for providing bright field illumination and other LEDs are configured for providing dark field illumination. The optical diffuser 14 is configured to diffuse light from some of the LEDs to achieve a diffused illumination pattern that can generally be considered as bright field illumination. The rigid belt 16 is configured to secure extended portions of the support frame 12 to form a complete framework, wherein this framework not only supports the LEDs in a stable orientation, but also is connected to the optical diffuser 14 to hold the body of the optical diffuser 14 in place. The rigid belt 16 also defines an open end 18 of the illuminator 10. The open end 18 may be positioned near an object to be sensed, such that light from multiple LEDs of the illuminator 10 is directed through the open end 18 to properly illuminate the object.

Figure 2:
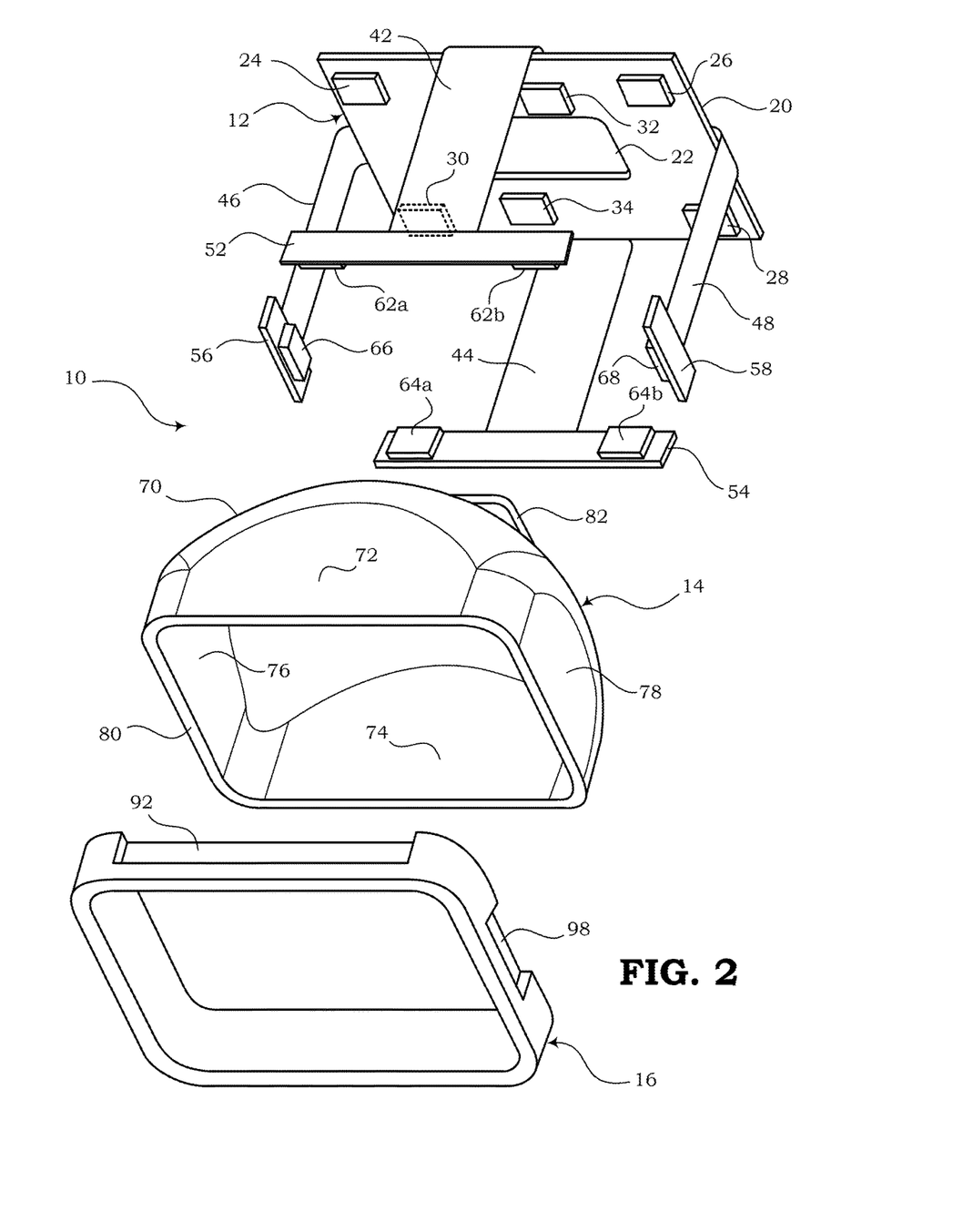
FIG. 2 schematically depicts an exploded view of the illuminator of FIG. 1 according to an embodiment of the present invention.

FIG. 2 illustrates an exploded view of the illuminator 10 of FIG. 1. In this view, the three main parts of the illuminator 10 (i.e., the support frame 12, optical diffuser 14, and rigid belt 16) are shown separated from each other.

As shown in FIG. 2, according to an exemplary embodiment, the support frame 12 of the illuminator 10 comprises a rigid plate 20 having an opening 22 formed in the middle of the rigid plate 20. The rigid plate 20 of the support frame 12 is configured to support a plurality of LEDs at the corners of the rigid plate 20. For example, LEDs 24, 26, and 28 are shown in FIG. 2 near three of the corners of the rigid plate 20, while a fourth LED 30, which is hidden from view in FIG. 2, is connected near a fourth corner of the rigid plate 20. The four LEDs 24, 26, 28, 30 are configured for illuminating an outside portion of the optical diffuser 14. Light is diffused through the optical diffuser 14 and is directed toward an object in the direction of the open end 18 of the illuminator 10.

Additional LEDs 32, 34 are also configured to be connected to the rigid plate 20 of the support frame 12. The LEDs 32, 34 are positioned more closely to the center of the rigid plate 20. In some embodiments, the LEDs 32, 34 may be positioned on opposite sides of the opening 22. In other embodiments, the LEDs may be positioned next to each other near the opening 22, as explained in more detail below with respect to FIG. 8.

The support frame 12 further comprises legs 42, 44, 46, 48, which extend from edges of the rigid plate 20. A first leg 42 extends from a front edge of the rigid plate 20, a second leg 44 extends from a back edge of the rigid plate 20, and third and fourth legs 46, 48 extend from opposite side edges of the rigid plate 20. According to the embodiment shown in FIG. 2, the legs 42, 44, 46, 48 extend out from the edges and at an angle that is substantially perpendicular to a planar surface of the rigid plate 20. Accordingly, the legs 42, 44, 46, 48, along with the rigid plate 20, essentially form a cage around the optical diffuser 14.

In addition, the support frame 12 includes panels 52, 54, 56, 58, which are connected to the ends of the legs 42, 44, 46, 48, respectively. A front panel 52 is connected to the front leg 42, a back panel 54 is connected to the back leg 44, and side panels 56, 58 are connected to the side legs 46, 48, respectively.

In some embodiments, as depicted in FIG. 2, the front and back panels 52, 54 have a greater width than the side panels 56, 58. The greater width allows these panels 52, 54 to accommodate more LEDs than can be accommodated by the side panels 56, 58. For example, two LEDs 62a, 62b are connected to opposite ends of the front panel 52 and two LEDs 64a, 64b are connected to opposite ends of the back panel 54. Another LED 66 is connected to the left side panel 56 and yet another LED 68 is connected to the right side panel 58. Therefore, in this embodiment, there may be six LEDs 62a, 62b, 64a, 64b, 66, 68 connected to the four panels 52, 54, 56, 58.

The LEDs 62, 64, 66, 68 may be arranged at essentially the same height with respect to the overall construction of the illuminator 10. Also, the LEDs 62, 64, 66, 68 are angled at approximately 90 degrees with respect to the illumination orientation of the LEDs 24, 26, 28, 30, 32, 34 connected to the rigid plate 20. The side-to-side light distribution of the LEDs 62, 64, 66, 68 provides dark field illumination near the open end 18 of the illuminator 10.

It should further be noted that light from the LEDs 62, 64, 66, 68, although at an angle, may shine directed on the surface of the object without any intervening light pipes, filters, diffusers, reflectors, or other elements. Thus, the efficiently of the light distribution in the present invention is not compromised by such light pipes, reflectors, and diffusers as would normally result with the use of conventional illuminators.

In some embodiments, the LEDs 24, 26, 28, 30, 32, 34, 62a, 62b, 64a, 64b, 66, 68 described above may instead be replaced with other types of lights. Preferably, however, the LEDs 24, 26, 28, 30, 32, 34, 62, 64, 66, 68 are tri-color LEDs, but in other embodiments, they may be single-color LEDs, dual-color LEDs, or a combination of single-color, dual-color, and tri-color LEDs.

Reference is now made to the optical diffuser 14 shown in the exploded view of FIG. 2. The optical diffuser 14 comprises a dome 70 having the shape of an ellipsoid. In some embodiments, the ellipsoidal dome 70 may have a spheroid shape. The dome 70 is a diffuser element, which may be constructed from a translucent material, such as plastic or other suitable substrate. Light from the LEDs 24, 26, 28, 30 is directed to the outer surface of the dome 70 and is diffused through the dome 70 to illuminate an object at the open end 18 of the illuminator 10 in a bright field illumination pattern.

The optical diffuser 14 also includes a front wall 72, back wall 74, left wall 76, and right wall 78, integrally formed with the dome 70. In some embodiments, the walls 72, 74, 76, 78 may comprise the same material as the dome 70. The walls 72, 74, 76, 78 include flat surfaces that may be connected, using any suitable adhesive or hardware elements, to the legs 42, 44, 46, 48, respectively.

An edge 80 of the optical diffuser 14 is formed at the bottom ends of the walls 72, 74, 76, 78. In the completed form of the illuminator 10, the edge 80 of the optical diffuser 14 may rest on a top edge of the rigid belt 16.

The optical diffuser 14 further comprises an alignment plate 82 formed at a top portion of the dome 70. The alignment plate 82 is inserted in the opening 22 of the rigid plate 20 to properly align the optical diffuser 14 with respect to the support frame 12. The dome 70 and alignment plate 82 include an opening (not shown in FIG. 2) through which an imaging sensor is inserted, the imaging sensor, for instance, being configured to optically sense the object being illuminated by the illuminator 10.

As is described in more detail below, the dome 70 further comprises apertures through which light from the LEDs 32, 34 may shine. In this way, LEDs 32, 34 can directly illuminate the object at the open end 18 of the illuminator 10 without any intervening elements, such as light pipes, reflectors, diffusers (e.g., the optical diffuser 14), or other elements. Thus, as explained above, the direct lighting technique of the present invention provides a more efficient way to illuminate an object. Again, a more efficient apparatus results in a reduction in energy required to power the illuminator 10, resulting in cost savings for the user.

Therefore, according to the description above, one implementation of the present invention may include the illuminator 10 comprising the support frame 12 and the optical diffuser 14 connected to the support frame 12. A first plurality of LEDs 62a, 62b, 64a, 64b, 66, 68 are connected to the support frame 12 and may be configured to provide dark field illumination at a high angle of incidence with respect to an object. The first plurality of LEDs 62, 64, 66, 68 is configured to provide illumination to the object without the use of a light pipe, diffuser, or reflector. A second plurality of LEDs 32, 34 are connected to the support frame 12 and may be configured to provide bright field illumination at a low angle of incidence with respect to the object. The second plurality of LEDs 32, 34 may be configured to provide illumination to the object without the use of a light pipe, diffuser, or reflector. Also, a third plurality of LEDs 24, 26, 28, 30 are connected to the support frame and may be configured to provide bright field illumination through the optical diffuser 14 without the use of a light pipe or reflector.

Furthermore, the above implementation may also be configured such with certain characteristics defining the support frame 12. For example, the support frame 12 may comprise the rigid plate 20, which may be configured to support the second and third pluralities of LEDs 24, 26, 28, 30, 32, 34. Also, the support frame 12 may further comprise a plurality of panels (e.g., panels 52, 54, 56, 58) configured to support the first plurality of LEDs 62a, 62b, 64a, 64b, 66, 68. Thus, six LEDs 62a, 62b, 64a, 64b, 66, 68 may be used for dark field illumination, while six other LEDs 24, 26, 28, 30, 32, 34 may be used for bright field illumination. The support frame 12 may further comprise a plurality of legs (e.g., legs 42, 44, 46, 48), each connected at one of its end to the rigid plate 20 and extending from edges of the rigid plate 20 at an angle substantially perpendicular to a planar surface of the rigid plate 20. The panels 52, 54, 56, 58 may then be connected to the other ends the legs 42, 44, 46, 48, respectively.

Furthermore, the illuminator 10 may be configured such that the optical diffuser 14 comprises an ellipsoid-shaped diffusing element, which may be defined by at least the dome 70. The third plurality of LEDs 24, 26, 28, 30 may be configured to illuminate an outside surface of the ellipsoid-shaped diffusing element or dome 70. This diffused illumination may be provided in addition to a direct bright field illumination technique or as an alternative bright field illumination. Also, the diffused illumination arrangement can provide a uniform distribution of light within an area of reading and can provide light that is uniformly incident on the object surface from near hemisphere directions.

Figure 3:
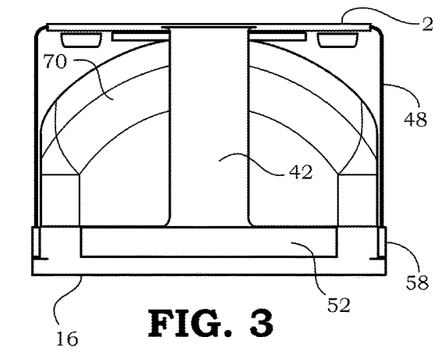
FIG. 3 schematically depicts a side view of the illuminator of FIG. 1 according to an embodiment of the present invention.
Figure 4:
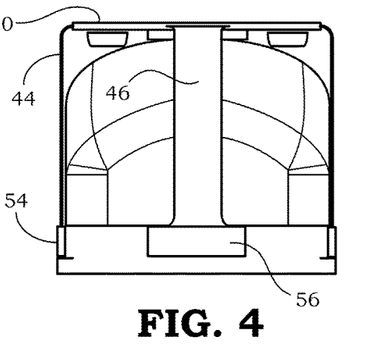
FIG. 4 schematically depicts an end view of the illuminator of FIG. 1 according to an embodiment of the present invention.

FIG. 3 shows a front side view of the illuminator 10 of FIGS. 1 and 2, and FIG. 4 shows a left side view or end view of the illuminator 10. The side views help to depict the difference in widths of the front panel 52 versus the left panel 56 and also help to depict the ellipsoidal characteristics of the dome 70 and optical diffuser 14. It should be noted that other shapes, dimensions, ratios, etc. of other illuminators have been contemplated and are considered to be within the spirit and scope of the present invention.

Figure 5:
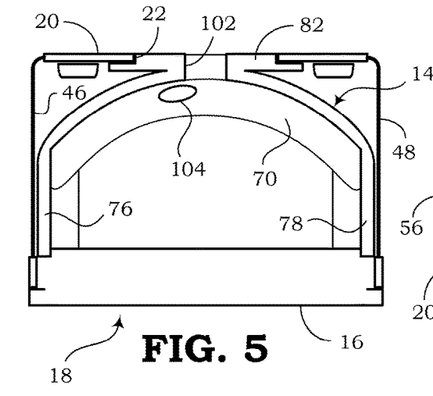
FIG. 5 schematically depicts a cross-sectional side view of the illuminator of FIG. 1 according to an embodiment of the present invention.

FIG. 5 shows a cross-sectional side view of the illuminator 10 of FIGS. 1 and 2. In particular, a cross-section of the optical diffuser 14 is shown. The sides 76, 78 of the optical diffuser 14 are arranged next to the legs 46, 48, respectively, and may be connected to the legs 46, 48 in any suitable manners, such as with an adhesive material or by other means. The alignment plate 82 of the optical diffuser 14 is positioned in the opening 22 of the rigid plate 20.

The dome 70 and alignment plate 82 include an aperture 102. The aperture 102 is configured to enable an optical sensing device, such as a barcode scanner, to be positioned therein such that the optical sensing device can image, sense, scan, or read the object positioned near the open end 18 of the illuminator 10. In addition to a sensing device, the aperture 102 or other aperture may also allow an aiming light beam to pass through, wherein the light beam may be used as a reference for the user to aim the beam at a spot on the object where the sensor can sense.

Additionally, the dome 70 includes at least one opening 104 aligned substantially with the positioning of the LEDs 32, 34 on the rigid plate 20. The opening 104 does not significantly alter the characteristics of the outside surface of the dome 70 regarding the illumination of dome 70 by the corner LEDs 24, 26, 28, 30. Instead, the opening 104 merely allows a direct illumination path to the object without intermediate light pipes, diffusers, or reflectors.

Figure 6:
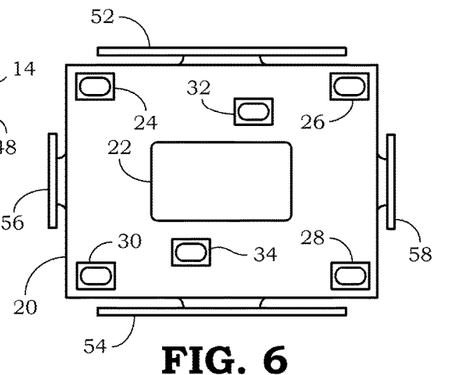
FIG. 6 schematically depicts a bottom view of the support frame shown in FIGS. 1 and 2 according to an embodiment of the present invention.

FIG. 6 shows a bottom view of the support frame 12 shown in FIGS. 1 and 2 with the optical diffuser 14 removed. For instance, FIG. 6 shows the underside of the rigid plate 20 with the opening 22 formed in the rigid plate 20. Also, an underside edge of the panels 52, 54, 56, 58 are shown from a perspective extending in a direction out of the page with respect to the surface of the rigid plate 20.

Also, the six LEDs 24, 26, 28, 30, 32, 34 for providing bright field illumination are shown attached to the underside of the rigid plate 20. To reiterate the above description, the four corner LEDs 24, 26, 28, 30 are used to illuminate the outer surface of the dome 70. The other two LEDs 32, 34 are used to shine directly onto the object without the use of a light pipe, reflector, or diffuser.

The inner LEDs 32, 34 may be positioned near the center of the rigid plate 20 near the centrally located opening 22. In some embodiments, one LED (e.g., LED 32) may be powered at one time while a bottom portion of an object is sensed. Thus, any light reflected off the object from the nearly perpendicular illumination from the LED 32 (located slightly above center) will not affect the sensing process for the bottom portion. Thereafter, the other LED (e.g., LED 34) may be powered while a top portion of the object is sensed. Reflection resulting from the other LED 34 (located slightly below center) will not affect the sensing process for the top portion. The two sensing procedures can be combined to create a complete image of the object, free from "hot spot" effects that can be introduced by the specular reflection off a polished or reflected surface of the object.

Figure 7:
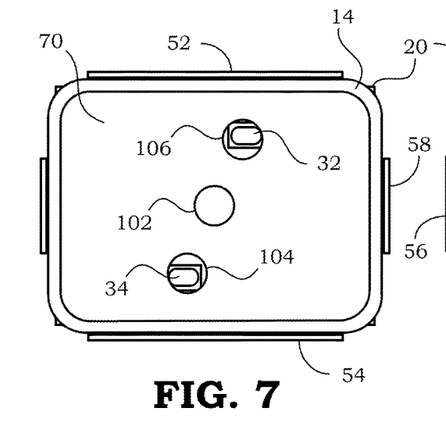
FIG. 7 schematically depicts a bottom view of the optical diffuser according to a first embodiment of the present invention.

FIG. 7 depicts a bottom view of a first embodiment of the optical diffuser 14 when inserted in the support frame 12. In particular, the aperture 102 for accommodating a sensor is shown. Also, openings 104 and 106 in the dome 70 of the optical diffuser 14 are shown. The openings 104, 106 are positioned to allow light from the LEDs 32, 34, respectively, to shine directly onto the object with an illumination center aligned with a center portion of the open end 18 of the illuminator 10. As is shown in FIG. 7, the openings 104, 106 may be offset slightly from the position of the LEDs 32, 34 on the rigid plate 20 to allow the LEDs 32, 34 to shine at an angle through the openings 104, 106 toward the center portion with the illumination area wide enough to cover the required reading area.

Figure 8:
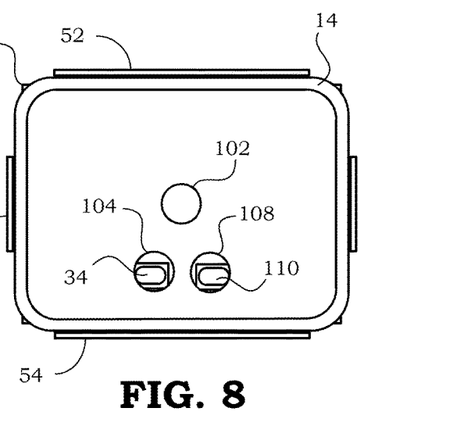
FIG. 8 schematically depicts a bottom view of the optical diffuser according to a second embodiment of the present invention.

FIG. 8 shows a bottom view of a second embodiment of the optical diffuser 14. The embodiment of FIG. 8 is similar to that of FIG. 7 except for the fact that a second opening 108 is positioned next to the opening 104. Also, instead of including LED 32, which is positioned on the opposite side of LED 34, as shown in FIGS. 2, 6, and 7, an LED 110 is shown oriented with respect to the second opening 108 on the same side as the opening 104 and LED 34.

This arrangement may be implemented in order to account for a sensing procedure where a sensing device (e.g., a handheld barcode scanner) might typically be oriented with a slightly upward tilt with respect to the object being sensed. This sensing procedure may be the result of a user unintentionally holding the sensor at an angle to aim the sensor toward a target that is in front of the user. The natural bend of the user's arm and hand when handling the scanner may result in a slightly upward tilt, thereby preventing the user (without some level of discomfort) from orienting the device in a manner that would be a completely perpendicular sensing arrangement. Therefore, illumination from the lower LEDs 34, 110 can be powered on at the same time in this embodiment, since reflection off the surface of the object will be sensed at a much lower position that is outside an effective sensing range.

The optical diffuser 14 may comprise a plurality of openings (e.g., openings 104, 106, 108) in the ellipsoid-shaped diffusing element (e.g., dome 70). The second plurality of LEDs 32, 34, 110, as mentioned above, may be configured to illuminate the object through the openings 104, 106, 108, respectively.

Figure 9:
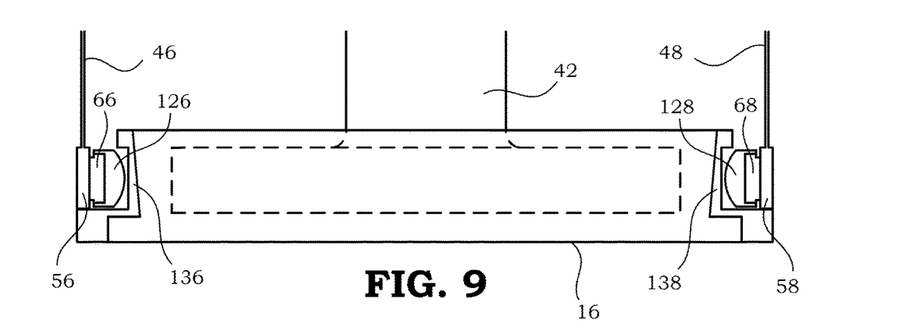
FIG. 9 schematically depicts a side view of the rigid belt shown in FIGS. 1 and 2 according to a first embodiment of the present invention.

FIG. 9 shows a side view of a first embodiment of the rigid belt 16 shown in FIGS. 1 and 2. LEDs 66 and 68 are shown in this view and are attached, as described above, to panels 56 and 58, respectively. Although not shown, LEDs 62 and 64 are likewise attached to panels 52 and 54. Attached to an outside surface of the lens of each of the LEDs 66, 68 are lens caps 126, 128. Similar lens caps (not shown) may be attached as well to LEDs 62 and 64. In some embodiments, the lens caps 126, 128 may have a cylindrical shape for directing light in a narrow path and for increasing light efficiency and uniformity.

In the embodiment of FIG. 9, the inner surface of the rigid belt 16 includes transparent sections. A left transparent section 136 is positioned next to the left lens cap 126 and a right transparent section 138 is positioned next to the right lens cap 128. Additionally, similar front and back transparent sections (not shown) may be positioned next to front and back lens caps (not shown) surrounding LEDs 62 and 64. The transparent sections (i.e., sections 136, 138, and those not shown) may have a constantly varying thickness, particularly at a location adjacent to the lens caps 126, 128 where light from the lens will normally be directed. The transparent sections 136, 138 can act as lenses to distribute light in an even manner across an object for uniform dark field illumination.

Figure 10:
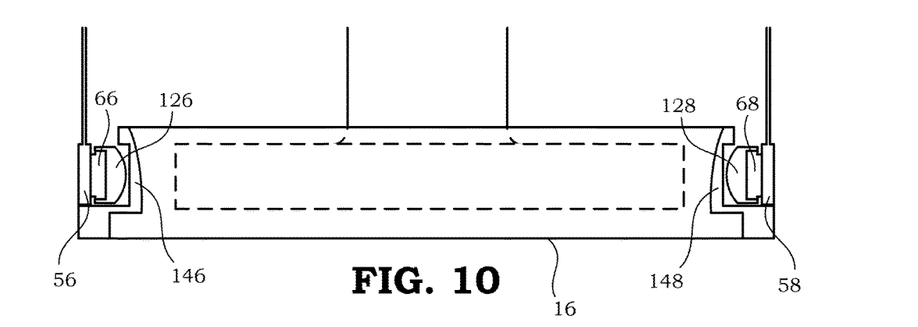
FIG. 10 schematically depicts a side view of the rigid belt shown in FIGS. 1 and 2 according to a second embodiment of the present invention.

FIG. 10 illustrates a side view of a second embodiment of the rigid belt 16 shown in FIGS. 1 and 2. The lens caps 126, 128 may be similar to those of the embodiment of FIG. 9. However, in the embodiment of FIG. 10, the rigid belt 16 may include transparent sections 146, 148 adjacent to lens caps 126, 128. Also, additional transparent sections (not shown) of the rigid belt 16 may be positioned adjacent to the front and back lens caps (not shown) corresponding to LEDs 62 and 64. The transparent sections (i.e., sections 146, 148, and those not shown) may have a thickness that varies in a non-constant manner with an aspherical or free-form surface arrangement.

Therefore, the rigid belt 16 connected to the plurality of panels 52, 54, 56, 58 may be defined as described above. The rigid belt 16 may be further comprise transparent elements (e.g., transparent sections 136, 138, 146, 148, etc.) configured to distribute light from the first plurality of LEDs 62a, 62b, 64a, 64b, 66, 68.

The illuminator 10 may comprise a plurality of caps or lens caps (e.g., lens caps 126, 128) at least partially surrounding lenses of the first plurality of LEDs 62a, 62b, 64a, 64b, 66, 68. Other caps or lens caps may be designed for at least partially surrounding the second plurality of LEDs 32, 34 and third plurality of LEDs 24, 26, 28, 30. For example, the lens caps (e.g., lens caps 126, 128) surrounding lenses of the first plurality of LEDs 62, 64, 66, 68 may include a cylindrical shape. The cylindrical shape may help to increase light efficiency and uniformity of the LEDs 62, 64, 66, 68. The caps at least partially surrounding lenses of the second plurality of LEDs 32, 34 may include an aspherical shape, which may help to achieve a desirable light distribution. Caps at least partially surrounding lenses of the third plurality of LEDs 24, 26, 28, 30 may include a highly aspherical shape, which may help to create a desirable light distribution, such as a batwing-shaped distribution.

Figure 11:
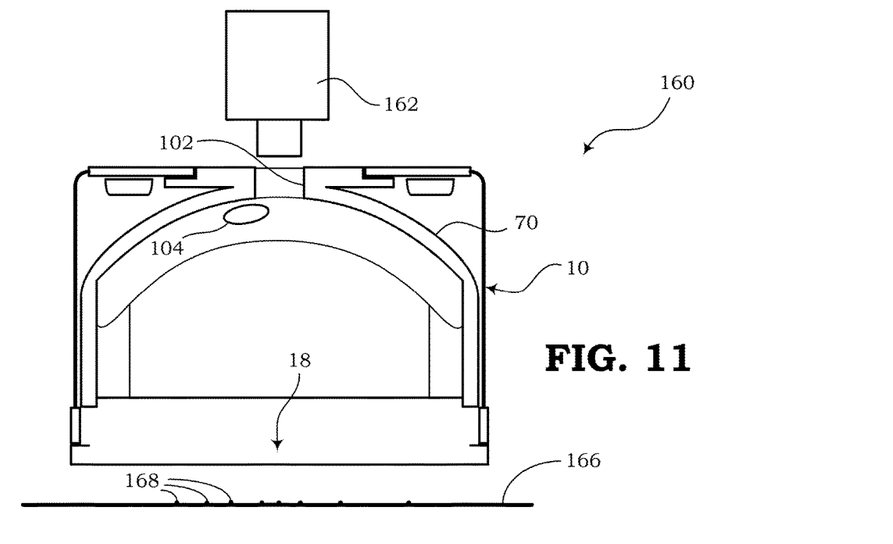
FIG. 11 schematically depicts a cross-sectional side view of an imaging device according to an embodiment of the present invention.

FIG. 11 depicts a cross-sectional side view of an embodiment of an imaging device 160. The imaging device 160 may comprise a sensor (e.g., a barcode reader) 162 and an illuminator (e.g., illuminator 10 described with respect to FIGS. 1-10). The sensor 162 may include a lens or sensing element that is inserted in the aperture 102 of the optical diffuser 14, thus allowing the sensor 162 to view and sense an object 166 unobstructed. In use, the imaging device 160 can be brought near the object 166 (or vice versa). In some instances, the object 166 may include markings 168, such direct part markings (DPM), dot peen marks, etc. For example, the markings 168 may be raised or textured markings that may best be illuminated by dark field illumination.

Therefore, according to the various embodiments described above, the present invention may be directed to the imaging device 160, which comprises an optical sensor (e.g., sensor 162) and an illuminator (e.g., illuminator 10). The optical sensor may be configured as the sensor 162 or another sensing device and the illuminator may be configured as the illuminator 10 or another illuminating device. In this embodiment, the illuminator 10 may also comprise the support frame 12 and a plurality of LEDs (e.g., any of LEDs 24, 26, 28, 30, 32, 34, 62, 64, 66, 68, 110) connected to the support frame 12. A first set of LEDs (e.g., LEDs 62, 64, 66, 68) of the plurality of LEDs is configured to provide dark field illumination at a high angle of incidence with respect to the object 166. The first set of LEDs 62, 64, 66, 68 may be configured to provide illumination without the use of a light pipe, diffuser, or reflector. A second set of LEDs (e.g., LEDs 32, 34, or alternatively LEDs 34 and 110) of the plurality of LEDs is configured to provide bright field illumination at a low angle of incidence with respect to the object 166. The second set of LEDs 32, 34, 110 may be configured to provide illumination without the use of a light pipe, diffuser, or reflector.

In addition, the imaging device 160 may be configured such that the illuminator 10 further comprises an ellipsoidal-shaped diffuser (e.g., optical diffuser 14) connected to the support frame 12. The ellipsoidal-shaped diffuser may comprise an aperture (e.g., aperture 102) through which the optical sensor 162 is configured to optically sense the object 166. Also, the ellipsoidal-shaped diffuser 14 may comprise a plurality of openings (e.g., openings 104, 106, 108) through which the second set of LEDs 32, 34, 110 directly illuminates the object 166.

The illuminator 10 of the imaging device 160 may further include a third set of LEDs (e.g., LEDs 24, 26, 28, 30) of the plurality of LEDs. This third set of LEDs may be configured to illuminate an outside surface of the ellipsoidal-shaped diffuser 14 to provide bright field illumination to the object 166 without the use of a light pipe or reflector. The illuminator 10 further comprises a plurality of caps positioned adjacent to the first, second, and third sets of LEDs. Caps positioned adjacent to the first set of LEDs 62, 64, 66, 68 include a cylindrical shape to increase light efficiency and uniformity. Caps positioned adjacent to the second set of LEDs 32, 34, 110 include an aspherical shape to achieve a desirable light distribution. Caps positioned adjacent to the third set of LEDs 24, 26, 28, 30 include a highly aspherical shape to create, for example, a batwing-shape light distribution.

The imaging device 160 may further be configured such that the support frame 12 of the illuminator 10 may comprise the rigid plate 20 and the plurality of panels 52, 54, 56, 58. The panels 52, 54, 56, 58 may be arranged substantially perpendicular to a planar surface of the rigid plate 20. The panels 52, 54, 56, 58 may be configured to support the first set of LEDs 62, 64, 66, 68, respectively, and the rigid plate 20 may be configured to support the second and third sets of LEDs. The illuminator 10 may further comprise the above-described rigid belt 16, which may be configured to be connected to the plurality of panels 52, 54, 56, 58. The rigid belt 16 may comprise transparent elements (e.g., transparent sections 136, 138, 146, 148, and other sections corresponding to the front and back LEDs 62a, 62b, 64a, 64b). These transparent elements may be configured to distribute light from the first set of LEDs 62, 64, 66, 68.

According to some embodiments, the illuminator 10 may further comprise a transparent screen (not shown) positioned on or near a bottom edge of the rigid belt 16 at the open end 18 of the illuminator 10. The transparent screen may be used to protect the internal components from the environment. Also, the transparent screen, in some embodiments, may include light refracting properly to enhance the distribution of light to the object. For implementations without the protective transparent screen, other similar transparent screens can be arranged with several small clear windows to seal the apertures/openings 102, 104, 106, 108 on the underside of the optical diffuser 14.

To supplement the present disclosure, this application incorporates entirely by reference the following commonly assigned patents, patent application publications, and patent applications:
U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;

U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;

U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An illuminator comprising:
a support frame;
an optical diffuser connected to the support frame;
a first plurality of light emitting diodes (LEDs) connected to the support frame, the first plurality of LEDs configured to provide dark field illumination at a high angle of incidence with respect to an object, the first plurality of LEDs further configured to provide illumination to the object without the use of a light pipe, diffuser, or reflector;
a second plurality of LEDs connected to the support frame, the second plurality of LEDs configured to provide bright field illumination at a low angle of incidence with respect to the object, the second plurality of LEDs further configured to provide illumination to the object without the use of a light pipe, diffuser, or reflector; and
a third plurality of LEDs connected to the support frame, the third plurality of LEDs configured to provide bright field illumination through the optical diffuser without the use of a light pipe or reflector.

2. The illuminator of claim 1, wherein the support frame comprises a rigid plate configured to support the second and third pluralities of LEDs.

3. The illuminator of claim 2, wherein the support frame further comprises a plurality of panels configured to support the first plurality of LEDs.

4. The illuminator of claim 3, wherein the support frame further comprises a plurality of legs extending from edges of the rigid plate at an angle substantially perpendicular to a planar surface of the rigid plate, and wherein the panels are connected to ends of the legs.

5. The illuminator of claim 4, further comprising a rigid belt configured to be connected to the plurality of panels, wherein the rigid belt comprises transparent elements configured to distribute light from the first plurality of LEDs.

6. The illuminator of claim 1, wherein the optical diffuser comprises an ellipsoid-shaped diffusing element.

7. The illuminator of claim 6, wherein the third plurality of LEDs is configured to illuminate an outside surface of the ellipsoid-shaped diffusing element to provide the bright field illumination to the object.

8. The illuminator of claim 6, wherein the optical diffuser comprises a plurality of openings in the ellipsoid-shaped diffusing element, and wherein the second plurality of LEDs is configured to illuminate the object through the openings.

9. The illuminator of claim 1, further comprising a plurality of caps at least partially surrounding lenses of the first, second, and third pluralities of LEDs.

10. The illuminator of claim 9, wherein caps at least partially surrounding lenses of the first plurality of LEDs include a cylindrical shape, caps at least partially surrounding lenses of the second plurality of LEDs include an aspherical shape, and caps at least partially surrounding lenses of the third plurality of LEDs include a wing shape.

11. The illuminator of claim 1, wherein each LED of the first, second, and third pluralities of LEDs is a single-color, dual-color, or tri-color LED.

12. An imaging device comprising:
an optical sensor; and
an illuminator comprising a support frame and a plurality of light emitting diodes (LEDs) connected to the support frame;
wherein a first set of LEDs of the plurality of LEDs is configured to provide dark field illumination at a high angle of incidence with respect to an object, the first set of LEDs further configured to provide illumination without the use of a light pipe, diffuser, or reflector; and
wherein a second set of LEDs of the plurality of LEDs is configured to provide bright field illumination at a low angle of incidence with respect to the object, the second set of LEDs further configured to provide illumination without the use of a light pipe, diffuser, or reflector.

13. The imaging device of claim 12, wherein the illuminator further comprises an ellipsoidal-shaped diffuser connected to the support frame.

14. The imaging device of claim 13, wherein the ellipsoidal-shaped diffuser comprises an aperture through which the optical sensor is configured to optically sense the object.

15. The imaging device of claim 13, wherein the ellipsoidal-shaped diffuser comprises a plurality of openings through which the second set of LEDs directly illuminates the object.

16. The imaging device of claim 13, wherein a third set of LEDs of the plurality of LEDs is configured to illuminate an outside surface of the ellipsoidal-shaped diffuser to provide bright field illumination to the object without the use of a light pipe or reflector.

17. The imaging device of claim 16, wherein the illuminator further comprises a plurality of caps positioned adjacent to the first, second, and third sets of LEDs, wherein caps positioned adjacent to the first set of LEDs include a cylindrical shape to increase light efficiency and uniformity, caps positioned adjacent to the second set of LEDs include an aspherical shape to achieve uniform light distribution, and caps positioned adjacent to the third set of LEDs include a highly aspherical shape to create a batwing shape light distribution.

18. The imaging device of claim 12, wherein the support frame of the illuminator comprises a rigid plate and a plurality of panels, wherein the panels are arranged substantially perpendicular to a planar surface of the rigid plate.

19. The imaging device of claim 18, wherein the panels are configured to support the first set of LEDs and the rigid plate is configured to support the second set of LEDs.

20. The imaging device of claim 19, wherein the illuminator further comprises a rigid belt configured to be connected to the plurality of panels, wherein the rigid belt comprises transparent elements configured to distribute light from the first set of LEDs.

* * * * *